US010032529B2

(12) United States Patent
Allen et al.

(10) Patent No.: US 10,032,529 B2
(45) Date of Patent: Jul. 24, 2018

(54) NUCLEAR REACTOR INTERNAL ELECTRIC CONTROL ROD DRIVE MECHANISM ASSEMBLY

(75) Inventors: Bruce F. Allen, Granby, CT (US); Gregory E. Falvo, Suffield, CT (US); Brian P. Coombs, West Springfield, MA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 1297 days.

(21) Appl. No.: 13/314,519

(22) Filed: Dec. 8, 2011

(65) Prior Publication Data

US 2012/0148007 A1 Jun. 14, 2012

Related U.S. Application Data

(60) Provisional application No. 61/421,245, filed on Dec. 9, 2010.

(51) Int. Cl.
*G21C 7/12* (2006.01)
*H02K 33/00* (2006.01)

(52) U.S. Cl.
CPC .............. *G21C 7/12* (2013.01); *H02K 33/00* (2013.01); *Y02E 30/39* (2013.01)

(58) Field of Classification Search
CPC ........... G21C 7/12; H02K 33/00; Y02E 30/39
USPC ........................................................ 376/229
See application file for complete search history.

(56) References Cited

U.S. PATENT DOCUMENTS

| 3,264,502 | A | | 8/1966 | Lytle |
| 3,959,071 | A | | 5/1976 | Bevilacqua |
| 4,696,783 | A | | 9/1987 | Lesauliner et al. |
| 5,009,834 | A | | 4/1991 | Tessaro |
| 5,066,451 | A | | 11/1991 | Tessaro |
| 5,307,384 | A | * | 4/1994 | King et al. ................. 376/228 |
| 5,513,229 | A | | 4/1996 | Willems |
| 2006/0126775 | A1 | | 6/2006 | Nishiguchi |
| 2007/0222308 | A1 | | 9/2007 | Yoshida et al. |
| 2009/0225923 | A1 | | 9/2009 | Neeley et al. |
| 2010/0316177 | A1 | * | 12/2010 | Stambaugh et al. .......... 376/229 |

FOREIGN PATENT DOCUMENTS

| JP | S56142499 U | 10/1981 |
| JP | S5752696 U | 3/1982 |
| JP | H01293509 | 11/1989 |
| JP | H0236396 | 2/1990 |
| JP | H02108998 A | 4/1990 |
| JP | H0458415 | 2/1992 |
| JP | H0485805 | 3/1992 |
| JP | 2003075577 A | 3/2003 |

\* cited by examiner

*Primary Examiner* — Frank J McGue
(74) *Attorney, Agent, or Firm* — Richard J. Coldren; Westinghouse Electric Company LLC

(57) ABSTRACT

A magnetic jack control rod drive rod drive system having the magnetic coils that operate the moving parts of the drive system wound from anodized aluminum magnet wire or ceramic coated nickel clad copper and enclosed within a hermetically sealed housing that is pressurized with helium.

14 Claims, 6 Drawing Sheets

NUCLEAR REACTOR INTERNAL ELECTRIC CONTROL ROD DRIVE MECHANISM ASSEMBLY

CROSS REFERENCE TO RELATED APPLICATION

This application claims priority under 35 U.S.C. § 119(e) to U.S. Provisional Patent Application Ser. No. 61/421,245, filed Dec. 9, 2010 entitled, INTERNAL ELECTRIC CRDM ASSEMBLY.

BACKGROUND

1. Field

This invention relates in general to nuclear reactor control systems, and, in particular to systems for controlling the movement of nuclear control rods into and out of the core of the nuclear reactor.

2. Description of Related Art

In a nuclear reactor for power generation, such as a pressurized water reactor, heat is generated by fission of a nuclear fuel such enriched uranium, and transferred into a coolant flowing through a reactor core. The core contains elongated nuclear fuel rods mounted in proximity with one another in a fuel assembly structure, through and over which the coolant flows. The fuel rods are spaced from one another in co-extensive parallel arrays. Some of the neutrons and other atomic particles released during nuclear decay of the fuel atoms in a given fuel rod pass through the spaces between fuel rods and impinge on the fissile material in adjacent fuel rods, contributing to the nuclear reaction and to the heat generated by the core.

Moveable control rods are dispersed throughout the nuclear core to enable control of the overall rate of the fission reaction, by absorbing a portion of the neutrons passing between fuel rods, which otherwise would contribute to the fission reaction. The control rods generally comprise elongated rods of neutron absorbing material and fit into longitudinal openings or guide thimbles in the fuel assemblies running parallel to and between the fuel rods. Inserting a control rod further into the core causes more neutrons to be absorbed without contributing to fission in an adjacent fuel rod; and retracting the control rod reduces the extent of neutron absorption and increases the rate of the nuclear reaction and the power output of the core.

The control rods are supported in cluster assemblies that are moveable to advance or retract a group of control rods relative to the core. For this purpose, control rod drive mechanisms are provided, typically as part of an upper internal arrangement located, at least in part, within the reactor vessel above the nuclear core. The reactor vessel of a pressurized water reactor is typically pressurized to a high internal pressure, and the control rod drive mechanisms are housed in pressure housings that are tubular extensions of the reactor pressure vessel. FIG. 1 is a schematic view of a prior art nuclear containment 10 housing a nuclear reactor pressure vessel 12 of a typical pressurized water reactor having a nuclear core 14 supported within the lower half of the pressure vessel 12. A control rod assembly 16, i.e., one of the cluster assemblies, is figuratively shown within the core 14 and supports a cluster of control rods 18 that are moved into and out of the fuel assemblies (not shown) by a drive rod 20. The drive rod 20 is moveably supported by a drive rod housing 24 that extends upwardly and through a removable reactor closure head 22. Control rod drive mechanisms (CRDM) are positioned above the reactor head around the control rod drive housing 24 and move the drive rods in a vertical direction to either insert or withdraw the control rods 18 from the fuel assemblies within the core 14. Rod position indicator coils 26 or other indicator mechanisms are positioned around the housing 24 to track the position of the drive rod 20, and thus the control rods 18 relative to the core 14. The output of the position indicator coils 26 is fed through a processor rod position indicator (RPI) electronics cabinet 28 within the containment 10. The output of the rod position indicator electronics cabinet 28 is then fed outside the containment to a logic cabinet 30 and an RPI processing unit 32. The logic cabinet 30 interfaces with the control system 34 which provides manual instructions from a user interface 36 as well as automatic instructions which are generated from intelligence obtained from plant sensors not shown. The logic cabinet 30 receives the manual demand signals from an operator through the user interface 36 and a reactor control system 34 or automatic demand signals from the reactor control system 34 and provides the command signals needed to operate the control rods 18 according to a predetermined schedule. The power cabinet 38 provides a programmed current to operate the CRDM, all in a well known manner.

One type of mechanism for positioning a control rod assembly 16 is a magnetic jack type mechanism, operable to move the control rod drive rod by an incremental distance, of approximately ⅝ inch (1.63 cm), into or out of the core in discrete steps. In one embodiment, the control rod drive mechanism has three electromagnetic coils and armatures or plungers actuated by the electromagnetic coils, that are operated in a coordinated manner to raise and lower the drive rod shaft 20 and a control rod cluster assembly 16 coupled to the shaft 20. The three coils (CRDM) are mounted around and outside the pressure housing 24. Two of the three coils operate grippers that when powered by the coils engage the drive rod shaft, with one of the grippers being axially stationary and the other axially moveable under the influence of the third coil.

The drive rod shaft has axially spaced circumferential grooves that are clasped by latches on the grippers, spaced circumferentially around the drive shaft. The third coil actuates a lift plunger coupled between the moveable grippers and a fixed point. If the power to the control rod mechanism is lost, the two grippers both release and the control rods drop by gravity into their maximum nuclear flux damping position. So long as control rod power remains activated, at least one of the stationary grippers and the moveable grippers hold the drive rod shaft at all times.

The three coils are operated in a timed and coordinated manner alternately to hold and to move the drive shaft. The sequence of gripping actions and movement is different depending on whether the stepwise movement is a retraction or an advance. The stationary grippers and the moveable grippers operate substantially alternately, although during the sequence of movements both types of grippers engage the drive shaft during a change from holding stationary to movement for an advance or retraction. The stationary gripper can hold the drive shaft while the movable gripper is moved to a new position of engagement for lowering (advancing) the drive shaft and the control rods. The moveable grippers engage the drive shaft when moving it up or down as controlled by the lift plunger. After the moveable gripper engages the drive shaft, the stationary gripper is released and then the plunger is activated or deactivated to effect movement in one direction or the other. Typically, each jacking or stepping movement moves the drive rod shaft ⅝ inch (1.6 cm), and some 228 steps are taken at about 0.8 seconds per step to move a control rod cluster over its full span of positions between the bottom and the top of a typical fuel assembly, though the number of steps will vary with the height of the fuel assembly.

A number of particular coil arrangements and gripper designs are possible. Examples of coil jacking mechanisms with a stationary gripper, a moveable gripper and a lifting coil, as described heretofore, are described, for example, in U.S. Pat. Nos. 5,307,384, 5,066,451 and 5,009,834. In addition, four and five-coil linear drive mechanisms have been employed that operate in a similar manner, such as that described in U.S. Pat. No. 3,959,071.

Whatever mechanical arrangement is employed for the grippers and lifting coils/armatures arrangement, the lifting coils are housed outside the pressure boundary of the reactor vessel where they can be cooled, usually by forced ventilation and are magnetically coupled to the latch assemblies through the pressure housings that surround the drive rods. However, at least one of the next generation nuclear reactors under development is a small modular reactor that has the core, upper internals, steam generator, pressurizer and inlets and outlets of the primary loop circulation pumps housed within the same pressure vessel. In such an arrangement, the entire control rod drive mechanism is immersed within the reactor coolant, in which the conventional arrangement of coils could not operate reliably. Even if the coils were housed to protect them from direct contact with the coolant, conventional coils could not withstand the temperatures they would experience in an operating cycle.

FIGS. 2 and 3 illustrate such a small modular reactor. FIG. 2 shows a perspective view, partially cut away, to show the pressure vessel and its internals. FIG. 3 is an enlarged view of the pressure vessel shown in FIG. 2. The pressurizer 54 is integrated into the upper portion of the reactor vessel head and eliminates the need for a separate component. A hot leg riser 56 directs primary coolant from the core 14 to a steam generator 58 which surrounds the hot leg riser 56. Six reactor coolant pumps 60 are circumferentially spaced around the reactor vessel at an elevation near the upper end of the upper internals 62. The reactor coolant pumps are horizontally mounted axial-flow canned motor pumps. The reactor core 14 and the upper internals 62, except for their size, are substantially the same as the corresponding components in an AP1000® reactor. From the foregoing, it should be apparent that a traditional magnetic jack control rod drive system would not function reliably in the reactor design illustrated in FIGS. 2 and 3, because the coils would be fully immersed in the coolant, and even if shielded from the coolant with an outer housing, would not readily receive sufficient cooling to prevent failures of the magnetic coils.

Accordingly, a new control rod drive mechanism is desired that will function with proven reliability while immersed in a reactor coolant.

Furthermore, such a design is desired that will satisfy regulatory requirements with minimal testing.

SUMMARY

These and other objects are achieved by a nuclear reactor power generating system having a reactor vessel including a lower section and removable upper head having a horizontal span closing off the lower section and forming a pressure vessel. A reactor core is housed in the lower section and comprises a plurality of fuel assemblies. A control rod assembly is provided, including at least one control rod that is driven into or out of a corresponding one of the plurality of fuel assemblies. A drive rod is connected to the control rod for driving the control rod into and out of the corresponding fuel assembly. A drive mechanism actuates the drive rod to move along a linear path as it drives the control rod into and out of the corresponding fuel assembly. The drive mechanism comprises a magnetic jack mechanism having a stationary gripper coil, a moveable gripper coil and a lift coil. The stationary gripper coil, moveable gripper coil and lift coil are wholly contained within the reactor vessel surrounded by a coolant that is circulated through the core. The stationary gripper coil, moveable gripper coil and lift coil are each sealed within a coil housing that is impervious to the coolant. In one embodiment, the coil housing is pressured with a gas, preferably helium, at approximately 400 psi.

Desirably, the linear path and the drive rod are situated below the horizontal span of the head and, preferably, at least some of the stationary gripper, moveable gripper or lift coil is wound of either anodized aluminum magnet wire or ceramic coated nickel-clad copper and insulated with a mica tape wrap and/or fiberglass sleeve.

BRIEF DESCRIPTION OF THE DRAWINGS

A further understanding of the invention claimed hereafter can be gained from the following description of the preferred embodiments when read in conjunction with the accompanying drawings in which:

DESCRIPTION OF THE PREFERRED EMBODIMENT

Figure 1:
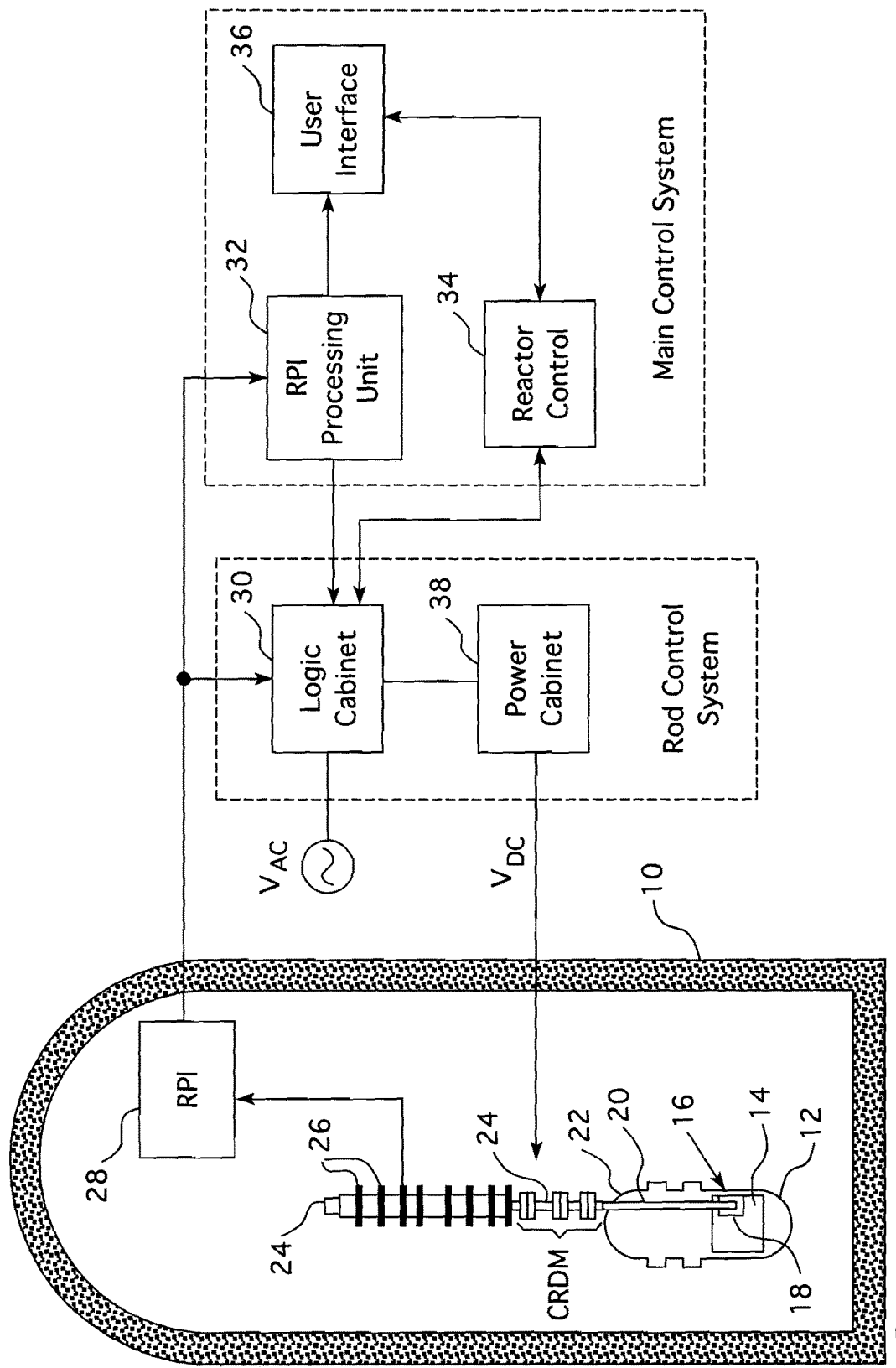
FIG. 1 is a schematic view of a traditional pressurized water reactor nuclear containment showing an outline of a nuclear reactor vessel supporting a control rod drive system for inserting and withdrawing a control rod assembly into and out of the core of the reactor vessel.

As stated in regard to FIG. 1, the control rods are attached in clusters 16, commonly referred to as spider assemblies, with each cluster being commonly driven by a drive rod 20 disposed in a vertical support housing 24 above the reactor core 14 containing the fuel assemblies into which the control rods 18 are advanced or from which the control rods are retracted for variable damping of nuclear flux within the reactor core. The moving parts of the control rod drive mechanism are within the pressure envelope of the reactor and in the conventional designs, the electromagnetic coils (CRDM) for driving the moveable parts are disposed around and about each of the housings 24 that extends above the reactor. In viewing the several figures, it should be appreciated that like reference characters refer to corresponding parts.

Figure 4:
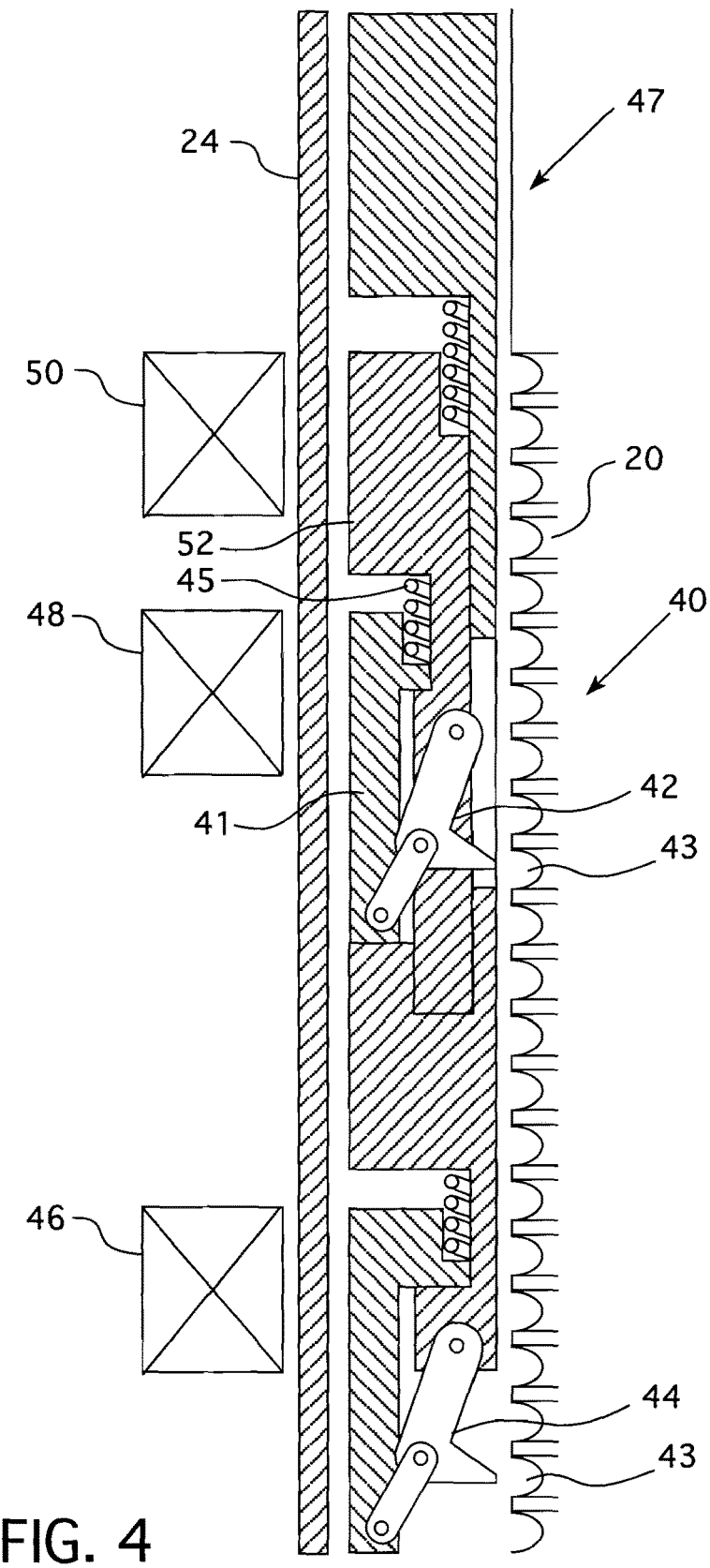
FIG. 4 is an enlarged schematic view of the control rod drive shaft drive system shown in FIG. 1 with a portion cut away to show the internal elements of the drive system.

FIG. 4 shows a drive rod drive mechanism 40 with the extended portion of the housing 24 of a traditional reactor partly cut away to show the grippers 42 and 44 that are operable in sequences to engage, lift and/or lower the drive rod 20 when the associated coils 46, 48 and 50 of the drive mechanism 40 are energized in a prescribed sequence. This arrangement is substantially as disclosed in U.S. Pat. No. 5,009,834.

The rod control system is a system that functions in conjunction with the nuclear plant instrumentation and control systems 34, as shown in FIG. 1, to insert or withdraw the control rods from the reactor core. A nuclear plant, commonly contains a number of control rod assemblies that are arranged in groups; typically, four control rod assemblies per group. Groups of control rod assemblies are usually inserted/withdrawn together to regulate the reactor temperature and power. The instrumentation and control system 34 monitors reactor temperature and power and provides signals to the rod control system to demand rod motion as appropriate. In response to these demand signals, the rod control system inserts/withdraws the control rods. Control rod motion is accomplished by cycling the electric power on/off to the various coils 46, 48 and 50 in the control rod drive mechanism 40 (shown in FIG. 4).

As previously mentioned, the control rod drive mechanism employed in many of the commercial pressurized water reactors currently in operation is a magnetic jack mechanism that can move the drive rod of a control rod assembly 16 in fixed increments each time power to the coils is cycled. A spider of control rods 18 is attached to the bottom of the control rod drive rod 20 (sometimes referred to as the drive shaft) so that all the control rods within an assembly move together. The control rod drive mechanism 40 shown in FIG. 4 contains three coils; a stationary gripper coil 46, a moveable gripper coil 48 and a lift coil 50. As mentioned in the previous paragraph, by cycling electric power to these coils on and off in different sequences, a conventional control rod mechanism 40 can cause the control rod drive shaft 20 and the control rods 16 to insert or withdraw from the nuclear core. More particularly, for lifting (retracting) the control rods, the following steps are accomplished in sequence, beginning with the stationary gripper 44 engaged in a drive rod groove 43 and the moveable gripper 42 and plunger 41 both being deactivated, (the plunger 41 extended in the direction biased by the spring 45. The sequence for lifting the drive rod 20 is:

1) the moveable gripper coil is energized which cause the moveable gripper 42 to engage an adjacent drive rod groove 43;
2) the stationary gripper 46 is de-energized and disengages the stationary gripper from the drive rod 20;
3) the lift coil 50 is energized and magnetically lifts the moveable gripper 44 and the drive rod 20 an elevation equal to the span of movement of the lift plunger 52;
4) the stationary gripper coil 46 is then energized which moves the stationary gripper into contact with the adjacent drive rod groove to hold the drive rod at the new elevation, i.e., both grippers are engaged;
5) the moveable gripper coil 48 is then de-energized and disengages the moveable gripper 42 from the drive rod groove; and
6) the lift coil 50 is de-energized, which drops the moveable gripper 42 back to its start position, only one step lower on the lifted drive rod 20.

Similarly, for lowering (advancing) the control rods, the following steps are accomplished in sequence, again beginning with only the stationary gripper coil 46 energized. The lower sequence is:

1) the lift coil 50 is energized, moving the moveable gripper 42 one step up along the drive rod 20;
2) the moveable gripper coil 48 is energized and the moveable gripper 42 grips the drive rod 20;
3) the stationary coil 46 is de-energized releasing the stationary gripper 44 from the drive rod;
4) the lift coil 50 is de-energized, dropping the moveable gripper 42 and the drive rod one step;
5) the stationary coil 46 is energized and the stationary gripper 44 engages the drive rod 20, at a position one step higher than its previous position; and
6) the moveable gripper coil 48 is de-energized and the moveable gripper 42 disengages from the drive rod 20.

As previously mentioned, a number of different arrangements of coil and gripper mechanisms are possible and should not detract from the breath of the invention claimed hereafter. Whatever mechanical configuration is employed for the grippers and lifting coils/armature arrangement, the coils have to operate effectively to produce a sufficient magnetic field so that the grippers can exert the designed force required to prevent the control rod drive rods from dropping into the core, which would necessitate an expensive shutdown of the reactor system.

Figure 2:
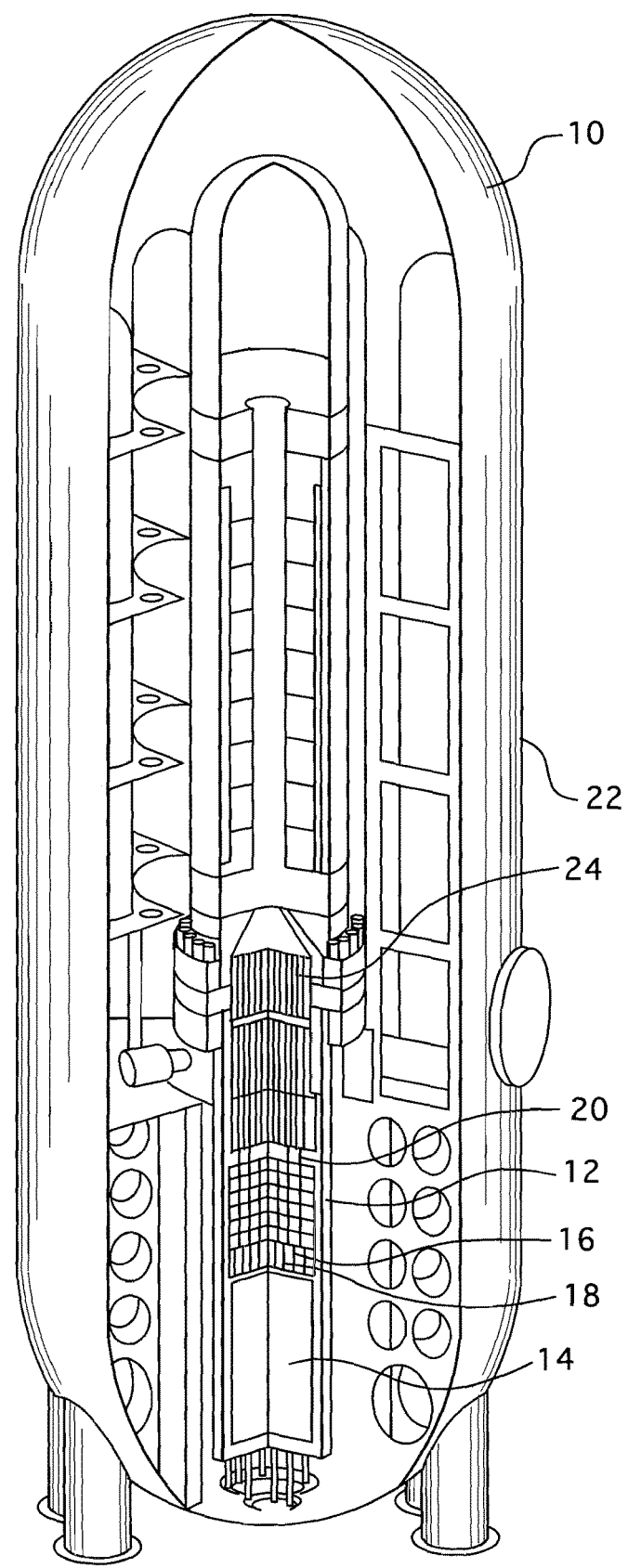
FIG. 2 is a perspective view, partially cut away, showing a small modular reactor system.
Figure 3:
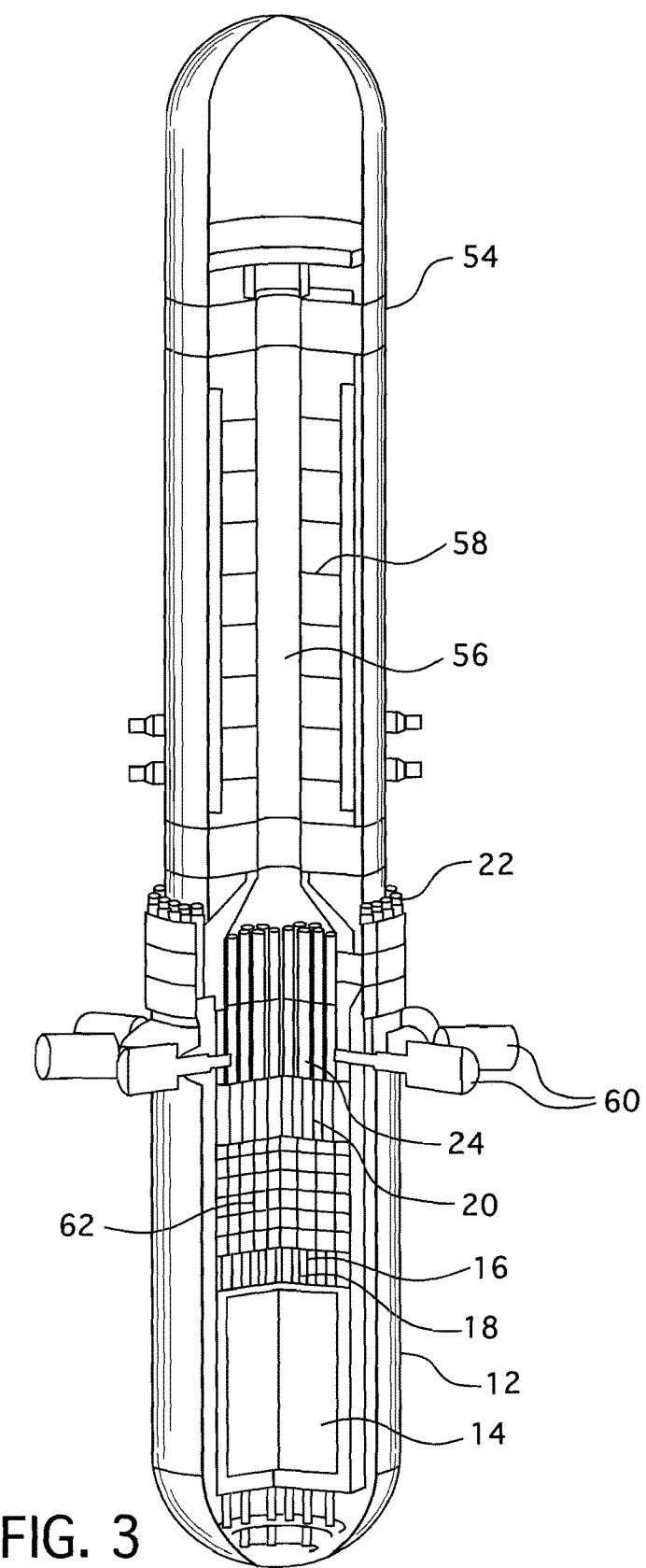
FIG. 3 is an enlarged view of the reactor shown in FIG. 2.

As also previously explained, the electrical coils used to activate the grippers 42 and 44 would not likely function reliably in an environment such as the modular reactors illustrated in FIGS. 2 and 3. However, the moving parts of the jack mechanism, i.e., the gripper and plunger assemblies have proven to be reliable over many years of service and the licensing of these new small modular reactors would benefit if the function and construction of the conventional gripper and plunger assemblies could be retained.

Figure 5:
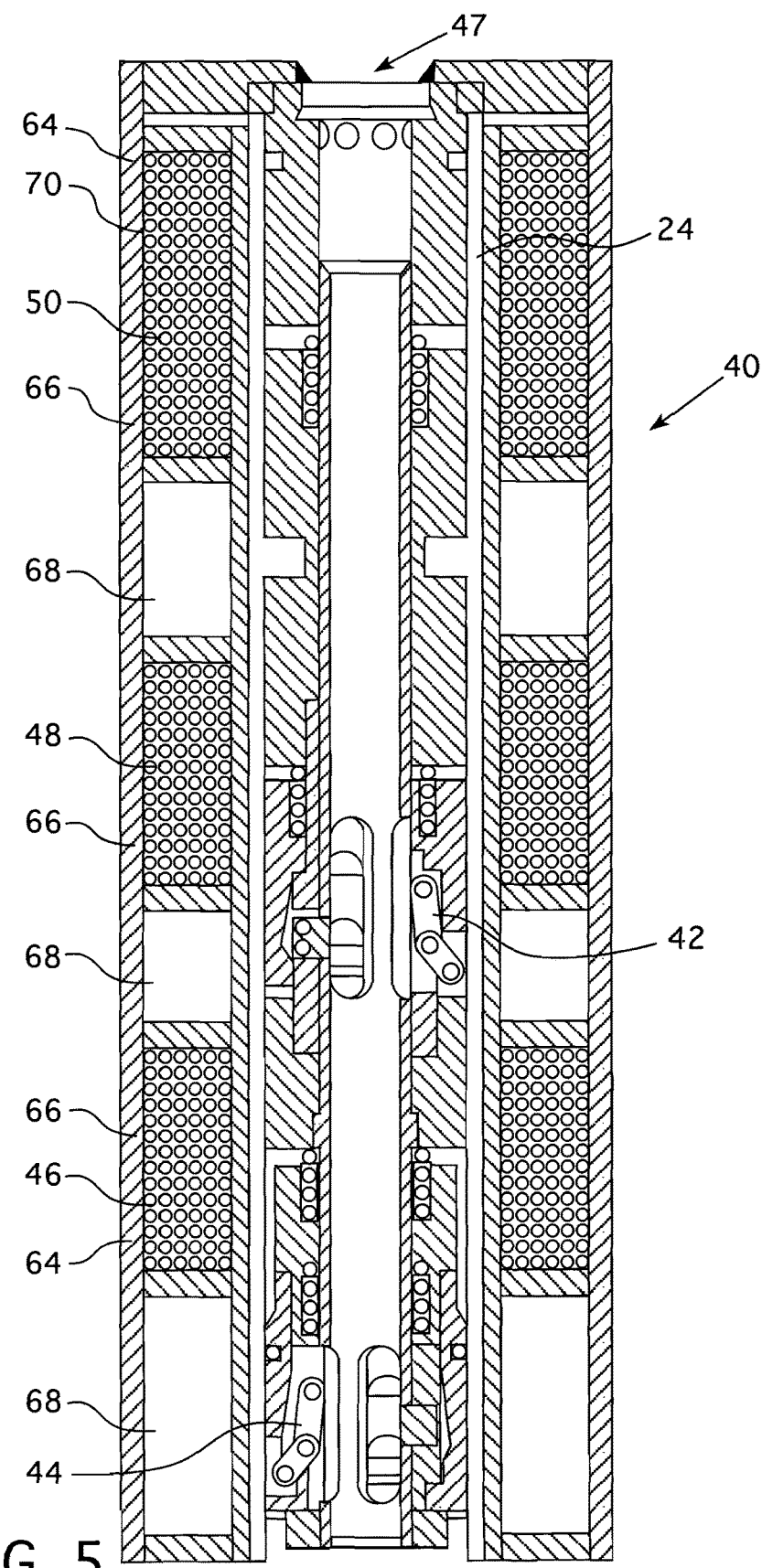
FIG. 5 is a schematic sectional view of a magnetic jack control rod drive mechanism constructed in accordance with this invention.

FIG. 5 shows the control rod drive rod drive mechanism 40 modified in accordance with this invention claimed hereafter, that retains, in large part, the proven attributes of conventional magnetic jack control rod drive rod drive systems. The plunger/latch assembly 37 is identical to that previously described with regard to FIG. 4 except that while the plunger/latch assembly is surrounded by a 304 stainless steel inner tubular housing 24, the housing 24 shown in FIG. 5 is not a pressure boundary like the housings illustrated in FIGS. 1 and 4. Each of the coils 46, 48 and 50 are enclosed within 410 magnetic stainless steel coil plates which are hermetically sealed to form a coil housing 66 which is impervious to the reactor coolant. The coil housings 66 are spaced from each other with hollow chambers 68 stacked in between and below the coil housings 66. The hollow chambers 68 and the coil housings 66 are sealed and preferably pressurized with a gas such as helium at a pressure of approximately 400 psi. The entire assembly is then circumferentially enclosed within a 304 stainless steel outer sleeve 70 to complete the assembly. Alternately, a single hermetically sealed housing can enclose all three coils. In addition, as another alternative, water cooling, employing reactor coolant can be conducted through the hollow chambers 68 or through channels in the hollow chambers 68.

Figure 6:
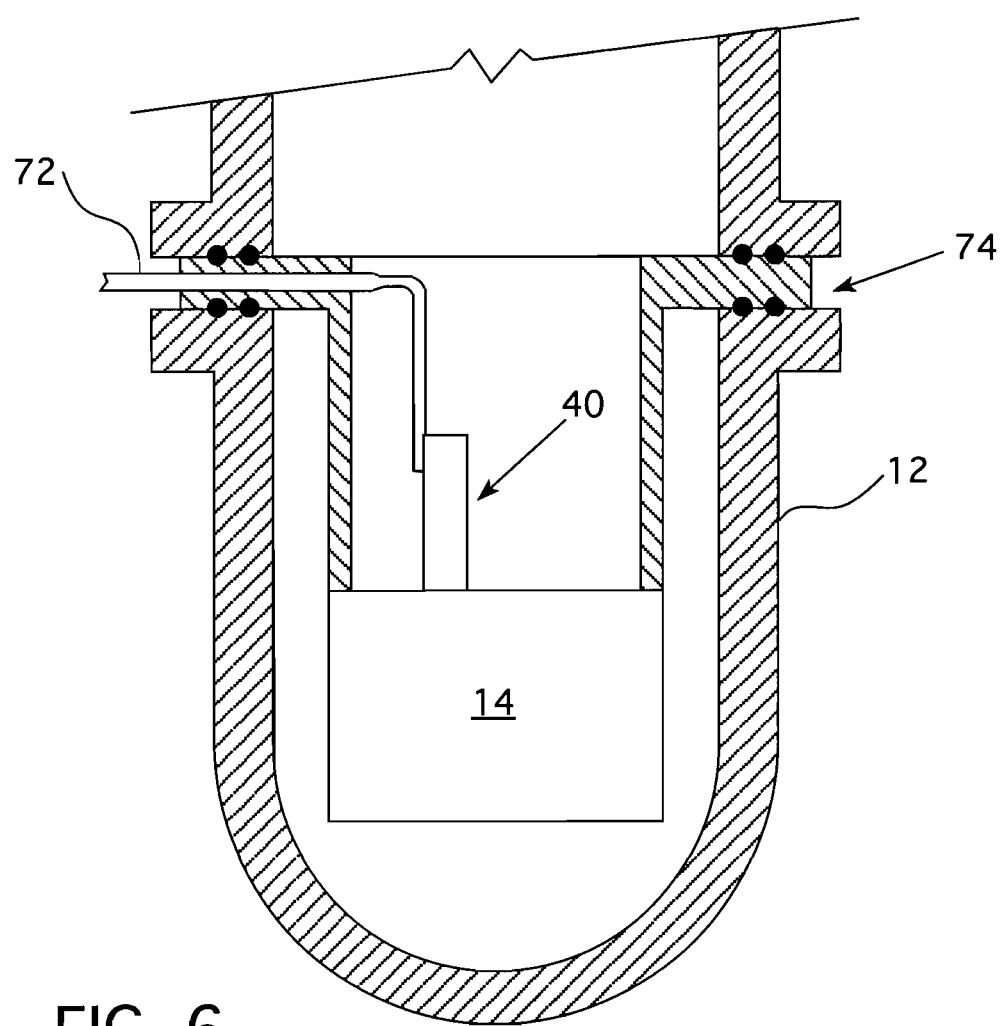
FIG. 6 is a schematic sectional view of the pressure vessel internals showing the routing of the coil cable as they are routed from the upper internals to the exterior of the pressure vessel.

Preferably, the coils 46, 48 and 50 are wound from anodized aluminum magnet wire or a ceramic coated nickel clad copper to withstand the high temperatures experienced within the reactor coolant and, are preferably pressurized with helium to 400 psi. The leads from each of the coils 46, 48 and 50 may be brought out of the reactor vessel 12 through a conduit tube, approximately one inch (2.54 cm) in diameter, through a spool piece 74, as shown in FIG. 6, where the leads can terminate in a standard electrical connector which can be coupled to the in-containment RPI cabinet 28 shown in FIG. 1. In all other respects the control rod drive rod drive system shown in FIG. 5 will function the same as conventional control rod drive mechanisms, as heretofore described.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. A nuclear reactor power generating system having a nuclear reactor comprising:
a reactor vessel including a lower section and a removable upper head having a horizontal span closing off the lower section and forming a pressure vessel;
a reactor core housed in the lower section and comprising a plurality of fuel assemblies;
a control rod assembly, supported entirely within the reactor vessel, including at least one control rod that is driven into or out of a corresponding one of the plurality of fuel assemblies, a drive rod connected to the control rod for driving the control rod into and out of the corresponding fuel assembly and a drive mechanism for activating the drive rod to move along a linear path as it drives the control rod into and out of the corresponding fuel assembly; and
wherein the drive mechanism comprises a magnetic jack mechanism having a stationary gripper coil, a moveable gripper coil, and a lift coil and the stationary gripper coil, moveable gripper and lift coils are wholly contained within the reactor vessel and are surrounded by a coolant that is circulated through the core, with the stationary gripper coil, moveable gripper coil and lift coil spaced from one another along the linear path with an enclosed hollow space there between within which a coolant can occupy.

2. The nuclear reactor power generating system of claim 1 wherein the stationary gripper coil, moveable gripper coil and lift coil are each sealed within a coil housing that is impervious to the coolant.

3. The nuclear reactor power generating system of claim 2 wherein the coil housing is pressurized with a gas.

4. The nuclear reactor power generating system of claim 3 wherein the gas is Helium.

5. The nuclear reactor power generating system of claim 4 wherein the Helium is pressurized to approximately 400 psi.

6. The nuclear reactor power generating system of claim 1 wherein the linear path and the drive rod are situated below the horizontal span of the head.

7. The nuclear reactor power generating system of claim 1 wherein the stationary gripper, moveable gripper or the lift coil is wound of anodized aluminum magnet wire.

8. The nuclear reactor power generating system of claim 1 wherein the stationary gripper, moveable gripper or lift coil is wound of ceramic coated nickel clad copper.

9. The nuclear reactor power generating system of claim 1 wherein the stationary gripper coil, the moveable gripper coil or the lift coil is insulated with a mica tape wrap.

10. The nuclear reactor power generating system of claim 1 wherein the stationary gripper coil, the moveable gripper coil or the lift coil is insulated with a fiberglass sleeve.

11. A nuclear reactor power generating system having a nuclear reactor comprising:
a reactor vessel including a lower section and a removable upper head having a horizontal span closing off the lower section and forming a pressure vessel;
a reactor core housed in the lower section and comprising a plurality of fuel assemblies;
a control rod assembly, supported entirely within the reactor vessel, including at least one control rod that is driven into or out of a corresponding one of the plurality of fuel assemblies, a drive rod connected to the control rod for driving the control rod into and out of the corresponding fuel assembly and a drive mechanism for activating the drive rod to move along a linear path as it drives the control rod into and out of the corresponding fuel assembly;
wherein the drive mechanism comprises a magnetic jack mechanism having a stationary gripper coil, a moveable gripper coil, and a lift coil and the stationary gripper coil, moveable gripper and lift coils are wholly contained within the reactor vessel and are surrounded by a coolant that is circulated through the core, with the stationary gripper coil, moveable gripper coil and lift coil spaced from one another along the linear path with an enclosed hollow space there between within which a coolant can occupy; and
wherein the stationary gripper coil, the moveable gripper coil and the lift coil are each enclosed within a separate sealed housing including hollow sealed chambers stacked below and between the coil housings that enclose the stationary gripper coil, the moveable gripper coil and the lift coil that form the enclosed hollow space.

12. The nuclear reactor power generating system of claim 11 in which the hollow sealed chambers have coolant passages for cooling adjacent coils through which a reactor coolant that has traversed the core can flow.

13. The nuclear reactor power generating system of claim 11 in which at least a portion of an interior of the hollow chambers are pressurized with a gas.

14. The nuclear reactor power generating system of claim 13 wherein the gas is helium.

* * * * *